United States Patent Office 2,849,593
Patented Aug. 26, 1958

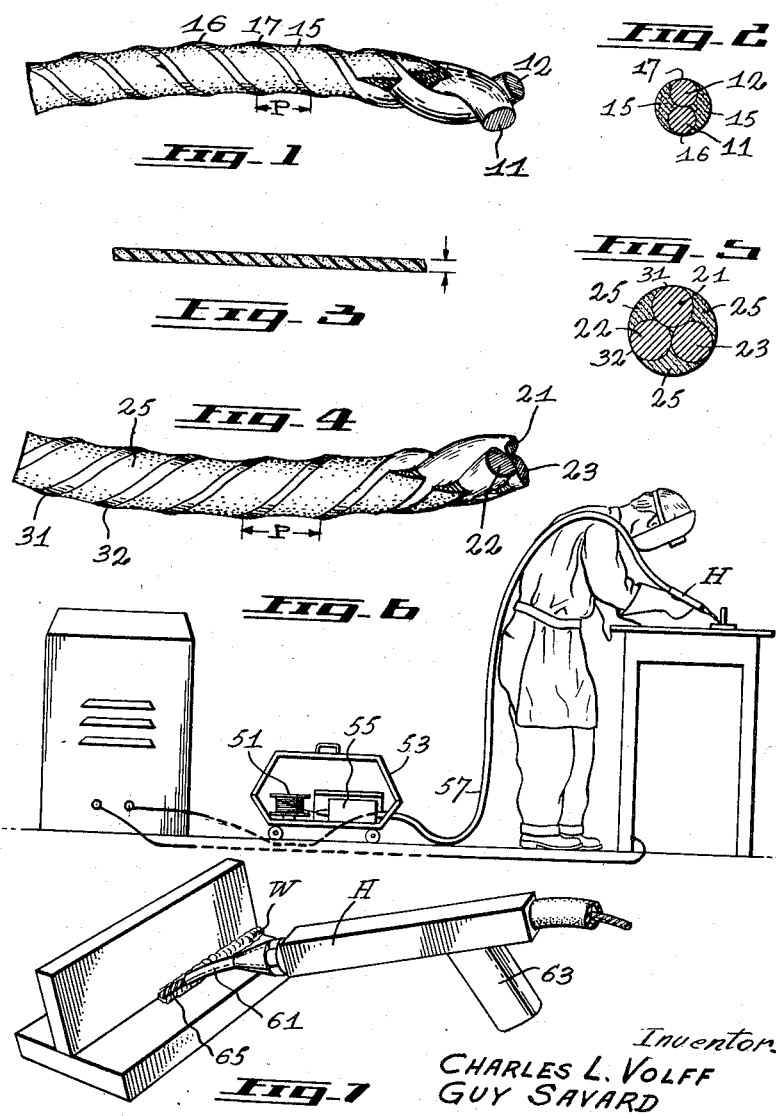

2,849,593

ELECTRIC ARC WELDING

Charles Volff, Paris, France, and Guy Savard, Vaudreuil, Quebec, Canada, assignors to L'Air Liquide, Societe Anonyme pour l'Etude et l'Exploitation des Procedes Georges Claude, Paris, France Application February 18, 1957, Serial No. 640,882

Claims priority, application France May 21, 1952

5 Claims. (Cl. 219—146)

This invention relates to continuous high speed electric arc welding and to a continuous consumable electrode and to its manufacture.

Continuous welding processes of the type to which the present invention belongs are carried out by continuously feding an electrode to an electrode holder and striking and maintaining an arc continuously as long as required for a particular welding operation. This should not be confused with the type of welding where a consumable electrode is employed and held fixedly in a holder and when used up has to be replaced. The operating conditions and the nature of the electrode are considerably different and do not involve the same problems.

In practice, it is essential in the welding operation to feed welding metal and at the same time to protect the welding pool of metal by a slag or some other protective medium. One way of doing this is to feed a wire electrode and to protect it by a flux powder fed in excess from a hopper. This has the disadvantage that the operator can only work in a flat position because the flux has to be fed by gravity. Besides, cumbersome apparatus is needed and the arc is screened by the flux so that the operator cannot see the work in process.

A further proposal has been to use a high density current and a bare wire electrode protected by an atmosphere of inert gas. This is too expensive to apply to most metals. The cost would be prohibitive, for example, for welding mild steel, or other base metals on which the bulk of welding is done. Moreover, even where it can be used, the inert gas has the sole function of screening and has no beneficial effect on the weld like that of a slag.

APPLICANTS' DEVELOPMENT

The applicants have found it possible to carry out a process of continuous electric arc welding at high speed by a method which avoids the disadvantages of prior methods and provides positive advantages and may be used manually or automatically. The applicants' method involves striking an arc between the work and the end of a continuous uniform flexible carrier of welding metal, then continuously feeding the continuous carrier and a continuous uniform ribbon of flux carried by the carrier to the site of welding. The arc is maintained whereby welding metal is burned off the carrier to form a pool of molten metal at the site of welding and the flux is continuously deposited at the site and transformed into slag to stabilize the arc, to shield the pool of welding metal, and to give metallurgical properties to the weld. By the applicants' method the conditions of welding can remain substantially constant, in other words, the continuous arc can be maintained and the weld can be carried out continuously without interruption.

In accordance with the invention the carrier may be of mild steel, stainless steel or of hard facing steel alloys. The proportion of flux fed to the proportion of welding metal is within the range from about 8% to about 16% by weight.

Preferably, this method is carried out by the use of a continuous electrode which is a part of the invention. This electrode is made up of from two to three bare-surfaced wires of mild steel twisted together in a spiral to form a flexible stranded wire carrier of welding metal. By the twisted construction, the wires provide spiral parallel lands which intervene by spiral flutes. A continuous spiral ribbon of unbaked flux is carried within each flute while the tops of the lands remain bare. Each wire has a uniform diameter within the range from about .040 inch to about .080 inch. The pitch is within the range from about four and a half to about three turns to the inch. The amount of flux is between about 8% and about 16% by weight of the metal of the electrode. The flux is compacted into the flutes and adhesively bonded to the wire surface in a dense solid mass so as to become an integral part of the electrode. The flux adheres to the metal sufficiently to substantially entirely prevent its shedding during normal handling and welding.

The wire is preformed before application of the flux. The wire may be made on a conventional twisting apparatus but after the twisting operation care must be taken to make sure that the wire has a "dead lay." The wire can, if necessary for this purpose, be straightened after the twisting operation. Otherwise the electrode does not feed evenly and an uneven arc results.

The flux is preferably a mineral flux of the rutile type. For the present invention, the flux is made up in the form of a specially fine powder. The manner of application of the flux to the electrode is important. It is made into a paste and applied by extruding the wire and flux through a die having a close fit to the wire. This extrusion is at a relatively high pressure, for example from about 200 to about 600 pounds per square inch. The wire coming from the extrusion is carried through a drying space at room temperature to dry the flux without making it brittle and is then wound on a spool.

The invention has generally been described and it will now be explained in more detail by reference to the accompanying drawings which illustrate preferred embodiments of it, and in which Figure 1 is a side elevation on an enlarged scale of a length of continuous two-wire welding electrode according to a preferred embodiment of the invention with the flux portion removed to show the diameter of the electrode.

Figure 2 is a transverse cross-section through the electrode of Figure 1.

Figure 3 is a side elevation of the length of the electrode of Figure 1 on substantially normal scale.

Figure 4 is an enlarged side elevation similar to Figure 1 of a three-wire electrode.

Figure 5 is a transverse cross-section through the electrode of Figure 4.

Figure 6 is a diagrammatical view showing a welder carrying on a welding operation with a continuous electrode according to the invention.

Figure 7 is a fragmentary perspective view to show a position of the welding torch in relation to the work in flash welding according to the invention.

Referring more particularly to Figures 1 to 3, a two-wire electrode is shown made up of 2 wires 11 and 12 twisted together in a helix and a ribbon of flux 15 filling the helical pocket formed between the respective wires. The surface of the wires or lands 16 and 17 between the pockets constitute electrical contact surfaces which continuously contact the welding torch or electrode holder.

Figure 4 illustrates a three-wire electrode made up of wires 21, 22 and 23 with a ribbon of flux 25 in the interstices between the lands 31 and 32 of the respective wires.

Pitch, as used in this application, means the distance between the "summit" of respective wires 11 and 12 along the surface of the electrode parallel to the axis. This is the distance $p$ illustrated on the drawings.

The welding operation is shown in Figure 6. The electrode is fed from the spiral 51 in a winder 53. The feeding is carried out by a feeding device 55 which includes a pair of rollers (not shown) which engage the electrode and feed it forward. The electrode is fed through a flexible cable 57 to an electrode holder H. The feeding device may be similar to that shown in United States Patent 2,544,801.

The electrode is passed through the electrode holder H down through the tape 61 to make contact with the work. As shown in Figure 7, the electrode holder H is advanced in "forehand." Thus the tape 61 points in the direction of movement of welding rather than the opposite direction as is usual.

The operator controls feeding through a trigger in the handle 63 and the electrode is fed with a portion 65 always protruding in advance of the tape 61. The arc is directed initially and is kept sustained as the weld W is made.

The invention will be described in more detail by reference to the following examples which describe specific preferred procedures and give specific preferred details of the electrodes employed.

Example I

WELDING OPERATION

A typical welding operation was carried out as follows:

*Work.*—The welding operation was fillet welding on the assembly of a mild steel turntable for a crane 15" in diameter, one half inch box sections.

*Apparatus used.*—The apparatus used was a continuous wire feeding apparatus, along the lines of that shown in United States Patent 2,544,801, but with no facilities for gas shielding. The reference to the U. S. patent is merely made to simplify the understanding of the type of apparatus used and its disclosure is hereby incorporated by reference.

*Electrode.*—There was employed a continuous electrode as defined herein and having the following specific characteristics:

| | |
|---|---|
| No. of wires | 2. |
| Size of wires | .060" in diameter. |
| Shape | Circular in cross-section. |
| Pitch | 4½ turns to the inch. |
| Lay | Dead. |

PROCESS

The welder struck an arc with a current of 330 amperes at 30 volts and with a terminal length of 1" and 1½". The welder maintained the arc at these conditions for two and one half minutes while welding "forehand" with the tip of the torch inclined diagonally to the work. The wire was continuously fed at a rate of 14 pounds per hour. The rate of welding was 15" per minute. The burn-off was such as to maintain the terminal length substantially constant within the range from about 1" to 3", preferably within the range from about 1.5" to about 2½". The electrode was fed constantly into the welding pool with substantially no whip thereby maintaining the arc without interruption. The welding took place in a normal atmosphere of air with no auxiliary gas shielding.

*Resulting weld.*—The resulting weld in appearance and quality was identical with that obtained by conventional flux-coated non-continuous electrode welding.

*Spool.*—The electrode was wound on a spool containing 20 lbs. (about 1,000') and was fed from this spool to the electrode holder.

Example II

MANUFACTURE OF ELECTRODE

An electrode having the wire characteristics as described in Example I was made as follows:

The wires were twisted together on a stranding machine. The wires were then straightened to make sure that it had a dead lay. Either operation could, however, be carried out in making small quantities of twisted wire by the use of hand tools. A right hand twist of the wires is preferred because this construction gives less spatter. The wire can be "as drawn" i. e. not annealed where care is taken in twisting it, and this represents a saving in cost.

Then on an extruding machine a rutile flux having the following characteristics was extruded onto the wire, in a paste form.

| Material: | Percent by weight |
|---|---|
| Ferro manganese | 16.5 |
| Rutile | 32.5 |
| Talc | 4.5 |
| Asbestos | 4.5 |
| Kaolin | 9.5 |
| Sodium carbonate | 4.1 |
| Cellulose | 12.3 |
| Silicate | 16.1 |

These materials were thoroughly mixed to form a homogeneous mixture which was formed into a paste with about 12% of moisture by weight. This paste was put into an extruding machine and the wire was run through the extruding machine with a die closely fitting the wire so that there was extruded on to the wire approximately 12% to 14% by weight of the flux.

The wire was passed from the extruding machine about a number of pulleys so that it was exposed to the atmosphere for about three or four minutes and then was wound on to a spool.

The flux was compacted into the flutes and adhesively bonded to the wire surface in a dense solid mass. The flux adhered to the metal sufficiently to prevent its shedding during normal handling and welding. The wire could be bent about a three inch radius without causing the flux to flake off. The surface of the lands presented by the tops of the wires projected beyond the flux so as to give a continuous smooth metal surface for electrical contact with the electrode holder.

FEEDING SPEED

According to the invention, the electrode is fed at a speed within the range from about 100 to about 150 inches per minute. The voltage employed is from 28 to 35 volts. The amperage is partly a function of a wire diameter. The following ranges of amperage are recommended.

| Wire diameter: | Amperage |
|---|---|
| .045 | 200 to 250 |
| .050 | 230 to 275 |
| .060 | 260 to 340 |
| .070 | 325 to 400 |

MANIPULATION

A great advantage of the present invention is high welding speed. The type of manipulation employed by the welder is a downhand method. Normally however, with for example using a gas shield, the welder has to proceed "backhand." However, according to the present method he can proceed "forehand." The inclination of the torch is shown in Figure 7.

By proceeding in this way the welder can see what he is doing and he can increase his speed up to 50 percent and it is usual to operate at a speed greater than 25 percent more than possible with the "backhand" method of downhand welding. For example, in welding a three-eighths inch plate he can proceed at a speed of from about 9 to about 15 inches a minute, whereas for a lighter plate of one quarter inch he can proceed at from about 15 to about 20 inches a minute while for a five-eighths inch plate he can proceed at about 8 to about 12 inches per minute. Thus from about 10 to about 25 pounds of electrode can be fed per hour (as compared to about 4 to about 10 pounds per hour for a stick electrode) with 17 pounds per hour a good working average.

CARRIER OF ELECTRODE WIRE

The wire from which the electrode is made can be of weldable quality mild steel, weldable quality stainless steel (as defined in the Handbook of the American Society for Metals, 1948 Edition), or of hard facing steel alloys. Hard facing steel alloys are those employed in the process of depositing alloys such as manganese steel and others which give an unusually hard surface on solidification. One example of the use of such alloys is in the facing of tractor blades to armor them against extreme wear and tear.

Critical characteristics of the carrier part of the electrode are as follows. The individual wires are preferably circular in cross-section and have a uniform diameter within the range from about .050 inch to about .080 inch. The pitch of twist is between about 4½ and about three turns to the inch, the less the diameter of the wire, the greater the pitch.

The wires may be twisted together by using a conventional twisting machine or they may be twisted together by hand using for example, a twist drill to perform the twisting operation while feeding the wire from a stationary position. The wire must have a "dead lay" and this can be done by straightening it to eliminate undue twist or curvature. The dead lay is important so that the wire does not have "whip" and move around at the tip of the electrode holder during welding which is likely to break the arc or to cause an unsteady arc.

FLUX

The selection of a flux which will answer the requirements of an electrode of this nature is also important. This flux must be very dense in order to provide sufficient flux per unit of length of the electrode to give fluxing at the weld. At the same time, it must be sufficiently adhesive to adhere to the wire of the electrode without flaking off during manufacture, handling or welding. One type of flux which is suitable includes, as functional agents, rutile in an amount from about 15% to about 35%, a wetting mineral for decreasing the surface tension of the slag, a body-giving fibrous material, a lubricating agent, a gas-forming agent, a slag removal agent, a deoxidizing agent, and a binder within the range from about 19% to about 26% by weight of the functional agents.

Preferably, the primary slag-forming agents, which include the rutile and the wetting mineral, are present in an amount from about 40% to about 55%. Preferably, the wetting mineral is ilmenite. The fibrous body-giving material is present within the range from about 5% to about 15% and the preferred such agent is asbestos having a size 70% through 200 mesh, and 100% through 100 mesh. The lubricating material is present within the range from about 5% to about 20% and the preferred lubricating agents are finely divided lubricating powders, for example, talc and kaolin. The gas-forming agents are present in an amount within the range from about 5% to about 10%, and are preferably made up of a cellulose material, for example, wood powder and a dissociable mineral, for example, iron carbonate. The slag removal agent is present within the range from about 5% to about 15% and is preferably feldspar. The deoxidizing agent is present within the range from about 12% to about 22% and is preferably ferro-manganese. The binder is present within the range from about 19% to about 26% by dry weight of the functional constituents, and is preferably sodium silicate with about 5% of a glycerin. Preferably, this binder is 38% solids and has a ratio of $SiO_2$ to $Na_2O$ of 3:1.

The flux is prepared by first mixing intimately the dry functional ingredients in a suitable mixing machine. Then the binder is added and intimately mixed with the dry materials to form a paste having a water content from about 18% to about 24% by weight.

When the flux has been prepared in this manner, it is applied to the wire by passing the wire through an extruding apparatus in which the flux is forced, under pressure, on to the wire as the wire is passed through a die. The flux thus remains intimately deposited and compacted within the spiral flutes of the wire adhering to the surface of the wire. The electrode thus formed is led through an extensive drying area at normal room temperature so that the flux is allowed to set without baking, to form a dry solid compact mass which adheres to the surface of the wire, resisting forces tending to remove it, for example bending and abrasion. It should be explained that baking causes the flux to become hard and brittle in which condition it cracks and separates more easily from the carrier wire.

The amount of flux on the wire is critical and is between about 8% and about 16% by weight of the electrode. At any less, there is insufficient flux to maintain adequate slag coverage, proper arc stability and good weld appearance, and at any more there is a tendency to make poor contact between the electrode and the contact tube of the welding gun. The amount of flux for a two-wire electrode preferably ranges between about 10% and about 14% and for a three-wire electrode between about 8% and about 11%.

For welding currents from about 270 up to about 375 amperes a two-wire electrode is preferred. For currents from about 325 to about 500 amperes, a three-wire electrode is preferred. The practical range of welding current is from about 250 to about 500 amperes.

The choice of mineral constituents is also made up to obtain proper arc stabilization under various electrical conditions. The fluxing material enables the process to work with D. C. or A. C. power supply and the electrode polarity can be made negative or positive to suit different welding conditions.

An electrode of the present invention has the following advantages.

(1) No accessories are necessary, as for example, with inert gas welding or with a flux that is separately fed. With both these types of welding, special accessories must be employed to feed the gas or the flux as the case may be.

(2) The use of the present electrode makes possible "position" welding. That is to say, the welding does not have to be accomplished on the horizontal. So in this respect it can be used under conditions where inert gas or better flux welding cannot be employed.

This application is a continuation-in-part of application Serial No. 356,208 filed May 20, 1953.

We claim:

1. A continuous electrode for electric arc welding comprising from two to three bare-surfaced circular cross-section wires of a weldable quality metal selected from the group consisting of mild steel, stainless steel and hard facing steel alloys, said wires being twisted together in a spiral and forming a continuous flexible stranded wire carrier of welding metal having a substantially dead lay, the wires of said carrier forming lands and intervening spiral flutes, a continuous ribbon of flux substantially filling each flute between the lands, the lands presenting a continuous bare top portion constituting continuous electrical contacts each of said wires having a uniform diameter within the range from about .040" to about .080", the pitch of twist being from about 3 to about 4½ turns to the inch, the amount of flux being an amount effective to provide a protective slag at high welding speed between about 8% and about 16% by weight of the electrode, the flux being an unbaked mineral flux having a density within the range from about 2.5 to about 3.5, the flux being compacted into the flutes and adhesively bonded to the wires in a continuous solid mass adhering to the metal to prevent it shedding during normal handling and welding.

2. A continuous electrode as defined in claim 1 in which there are two wires.

3. A continuous electrode as defined in claim 1 in which there are three wires.

4. A continuous electrode according to claim 1 in which the flux is of a rutile type having primary slag-forming materials present in an amount of from about 45% to about 55% by weight of the flux and including rutile in an amount of about 20% to about 35% by weight of the flux.

5. A continuous electrode for electric arc welding comprising from two to three bare-surfaced circular cross-section wires of a weldable quality metal selected from the group consisting of mild steel, stainless steel and hard-faced steel alloys, said wires being twisted together in a spiral and forming a continuous flexible stranded wire carrier of welding metal having a substantially dead lay, the wires of said carrier forming lands and intervening spiral flutes, a continuous ribbon of flux substantially filling each flute between the lands, the lands presenting a continuous bare top portion constituting continuous electrical contacts, each of said wires having a uniform diameter within the range from about .040" to about .080", the pitch of twist being from about 3 to about 4½ turns to the inch, the amount of flux being an amount effective to provide a protective slag at high welding speed between about 8% and about 16% by weight of the electrode, the flux being compacted into the flutes and adhesively bonded to the wires in a continuous solid mass adhering to the metal to prevent it shedding during normal handling and welding.

References Cited in the file of this patent

UNITED STATES PATENTS

| | | |
|---|---|---|
| 1,277,639 | Pescatore | Sept. 3, 1918 |
| 1,361,269 | Mattice | Dec. 7, 1920 |
| 1,829,933 | Horn | Nov. 3, 1931 |
| 1,963,729 | Alexay | June 19, 1934 |